US005483283A

United States Patent [19]
Kannegundla

[11] Patent Number: 5,483,283
[45] Date of Patent: Jan. 9, 1996

[54] THREE LEVEL HIGH SPEED CLOCK DRIVER FOR AN IMAGE SENSOR

[75] Inventor: Ram Kannegundla, Rochester, N.Y.

[73] Assignee: Eastman Kodak Company, Rochester, N.Y.

[21] Appl. No.: 247,725

[22] Filed: May 23, 1994

[51] Int. Cl.$^6$ .............................. H04N 5/335; H03K 4/24
[52] U.S. Cl. ..................... 348/312; 348/321; 327/111; 327/295; 326/59; 326/62
[58] Field of Search .................................. 348/312, 320, 348/321, 319, 318, 311, 316; 307/269, 270, 475; H04N 5/335

[56] References Cited

U.S. PATENT DOCUMENTS

| | | | |
|---|---|---|---|
| 4,354,123 | 10/1982 | Earon, Jr. ........................... | 307/475 |
| 4,949,183 | 8/1990 | Stevens .............................. | 348/323 |
| 5,047,660 | 9/1991 | Kannegundla et al. ............. | 307/270 |
| 5,237,422 | 8/1993 | Kannegundla et al. ............. | 348/320 |

*Primary Examiner*—Joseph Mancuso
*Assistant Examiner*—Andrew B. Christensen
*Attorney, Agent, or Firm*—James D. Leimbach

[57] ABSTRACT

A high speed clock driver circuit for use with an area image sensor which has two horizontal shift registers is disclosed. Circuitry is provided which is responsive to the third level of one of the horizontal high speed clock driver signal and the vertical transfer signals for enabling the transfer, in parallel, of pixels from the first register into the second horizontal shift register.

2 Claims, 5 Drawing Sheets

THREE LEVEL HORIZONTAL CLOCK OUTPUT

THREE LEVEL HIGH SPEED CLOCK DRIVER FOR AN IMAGE SENSOR

FIELD OF INVENTION

The present invention relates to image sensors which have two horizontal shift registers associated with an area image sensor.

BACKGROUND OF THE INVENTION

Solid-state area image sensors of the interline type normally include an array having columns and rows of photodetectors. A so-called vertical shift register is located adjacent to each of the columns of photodetectors, and charge carriers generated in the photodetectors are transferred to the vertical shift registers during each frame time. The entire detected image is then shifted down in unison and transferred to a horizontal shift register one line at a time. The horizontal shift register delivers the charge carriers in each line to signal processing circuitry before the next line is shifted in.

Charge coupled devices often referred to as "CCDs" are photosensitive devices and used primarily for electronic imaging. Image sensors can also use photodiodes associated with vertical CCDs. This is called an interline image sensor. Each photodiode on the image sensor is called a pixel. The image resolution clocked out of the sensor is improved by increasing the number pixels on the sensor. The frame rate of emptying a sensor is inversely proportional to the number of sensor pixels and directly proportional to the speed of horizontal clocks. The speed at which these sensors can be clocked out depends on a number of parameters. The frame rate is typically increased by providing multiple horizontal shift registers.

As shown in FIG. 1, there is a prior art design which includes two horizontal shift registers 20 and 22. There is shown an image sensor 10 which is coupled to the two horizontal shift registers. Image sensor 10 includes an imaging region 12 which has photosensitive elements 14 arranged in columns and rows. These photosensitive elements can typically be photodiodes. Adjacent each column of photosensitive elements 14 is a vertical shift register 15 for receiving charge carriers from the photosensitive elements 14 and transferring the charge carriers out of the imaging region 12. The charge carriers are transferred from imaging region 12 to the two horizontal shift registers 20 and 22. Shift registers 15, 20, and 22 are charge-coupled devices (CCDs). Charge carriers from the imaging region 12 are transferred into horizontal shift register 20, one row at a time. From horizontal shift register 20, the row of charge carriers can be shifted into the horizontal shift register 22 so that another row of charge carriers can be shifted into the horizontal shift register 20. When both horizontal shift registers 20 and 22 are full, the charge carriers can be shifted out to an output circuit (not shown) through buffer amplifiers 24 and 26. For a further description of an image sensor having multiple horizontal shift registers, see commonly assigned U.S. Pat. No. 4,949,183, the disclosure of which is incorporated by reference herein.

Charge is transferred downwardly from the image sensor, a row of pixels at a time, under the control of vertical clock driver signals $V_1$ and $V_2$ (FIG. 1). The vertical clock driver signal $V_1$ is used to transfer a row of pixels, in parallel, into the first horizontal shift register 20. Horizontal clock signals $H_{1A}$ and $H_{1B}$ are used to shift pixel information, a pixel at a time within horizontal shift registers 20 and 22. The vertical clock $V_2$ is used to transfer a line of pixels from the horizontal shift register 20 into the horizontal shift register 22. In order to help facilitate this transfer with a minimum amount of charge loss, the horizontal clock driver of the present invention signal $H_{1B}$ has three levels. The third or highest level, as will be seen, is used to aid in that transfer.

Normally, the horizontal shift registers 20 and 22 transports the charge, pixel by pixel, to the output buffer amplifiers 24 and 26 by electrodes. These electrodes are electrically connected to the horizontal clock driver signals $H_2$ and $H_{1A}$ and are fed to electrodes on the horizontal shift register 20. The second horizontal shift register 22 transports the charge, pixel by pixel, to the output buffer amplifier 26 in a similar manner under the control of the horizontal clock signal $H_{1B}$. The charge is transferred into the second horizontal shift register 22 from the first horizontal shift register 20 by changing the potential levels (clock levels) on signals $H_{1A}$ and $H_{1B}$, such that potential of $H_{1A}$ is more negative than the potential of $H_{1B}$. These clock signals normally operate in two levels, namely low level and high level. For transferring the charge from the first horizontal shift register 20 to the second horizontal shift register 22, the present invention employs a third level signal is provided by the $H_{1B}$ clock signal, ensuring there will be better charge efficiency.

In order to increase the frame transfer rate, the sensor's horizontal shift registers are clocked out as fast as possible. At high speed, the driver circuit needs to provide high edge current. There are some clock drivers which can drive CCDs up to 40 megahertz with a clock signal voltage swing of 10 volts. Discrete component clock drivers using high speed switching transistors can operate up to 40 megahertz. For the sensors with the kind of architecture shown in FIG. 1, there is a need for a third level on the horizontal clock driver signal $H_{1B}$ which also drives the sensor at 40 megahertz.

Heretofore, in some arrangements, three level vertical clock driver signals have been used. The advantage of three level arrangement is that the highest level can be used to aid in transfer of charge and is frequently used for transferring charge from a photodiode to a vertical shift register. These vertical clock signals are normally operated in the kilohertz range with a pulsewidth of 1–10 microseconds. However, this arrangement has a number of difficulties associated with it. The most important being that it can not be used for high speed clock transfer. High speed clock transfer is achieved by high speed horizontal clock drivers and typically operates between 10–40 megahertz.

SUMMARY OF THE INVENTION

It is an object of the present invention to provide an arrangement which facilitates the transfer of a line of pixels from a first horizontal shift register into a second horizontal shift register associated with an area sensor with improved charge transfer efficiency.

This object is achieved by a high speed clock driver circuit for use with an area image sensor comprising:

a) first and second horizontal shift registers;

b) means for producing vertical transfer signals for causing the transfer of a line of pixels from the image sensor in parallel into the first horizontal shift register;

c) means for producing two inverted horizontal high speed clock driver signals with one of such signals having a third level, such inverted horizontal signals being used for transfer of pixels from the respective first and second shift horizontal registers; and d) means responsive to the third level of one of the horizontal high speed clock driver signal and the vertical transfer signals for enabling the transfer, in parallel, of pixels from the first register into the second horizontal shift register.

ADVANTAGES

An advantage of the present invention is that it facilitates charge transfer between first and second horizontal shift registers with improved charge transfer efficiency.

Another advantage of the present invention is that it employs circuits which can be implemented with a relatively simple design to provide a three level high speed horizontal clock driver signal.

DETAILED DESCRIPTION OF THE PREFERRED EMBODIMENT

Figure 1:
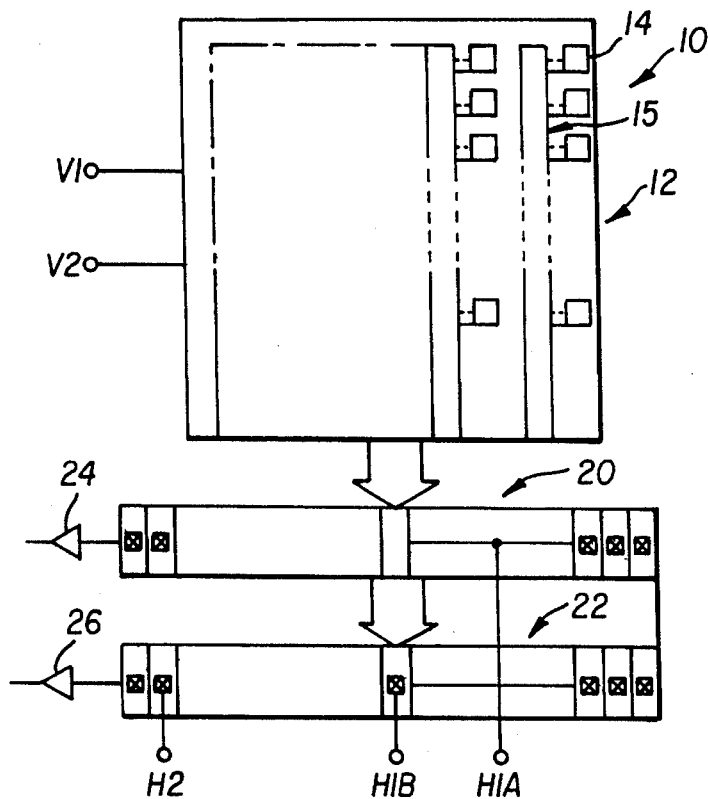
FIG. 1 is a plan view of a prior image sensor.
Figure 2:
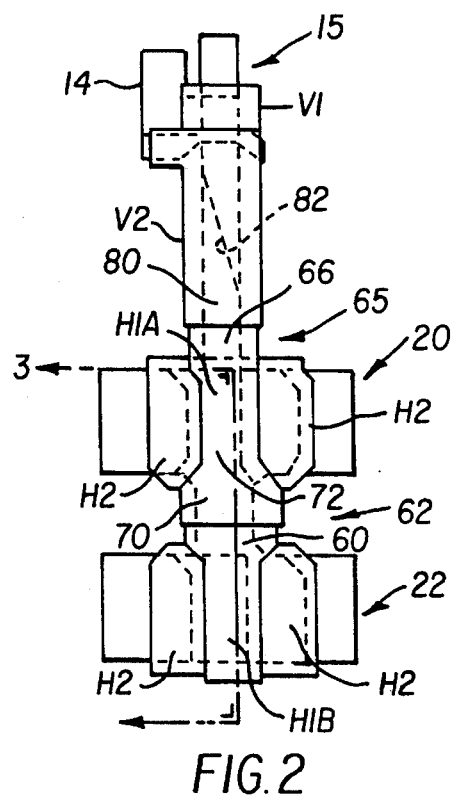
FIG. 2 is an enlarged plan view of a portion of the horizontal shift register of FIG. 1.
Figure 3:
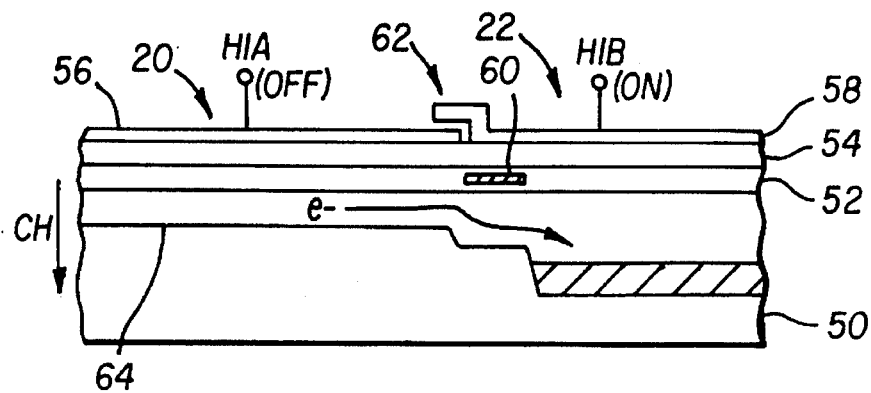
FIG. 3 is a cross sectional taken along the lines 3—3 in FIG. 2.

Where parts correspond to those in FIGS. 1 and 2, the same numerals will be used. In FIG. 3 there is shown a cross sectional view of the horizontal shift registers 20 and 22. A substrate 50 includes a buried channel 52. The substrate 50 can be, for example, a p-type material, and a buried channel 52 can be an n-type material. An insulating layer 54 is formed on the substrate 50. An electrode 56 in horizontal shift register 20 and an electrode 58 in horizontal shift register 22 are formed over the insulating layer 54. Electrodes 56 and 58 can be formed, for example, from polysilicon. The horizontal clock driver signals $H_{1A}$ and $H_{1B}$ are connected to the electrodes 56 and 58, respectively. A p-type barrier implant 60 is formed in buried channel 52 to form a transfer gate 62 which functions with electrode 58. The horizontal voltage of high speed clock signal $H_{1A}$ causes a potential profile 64 (FIG. 3) which transfers charge carriers from horizontal shift register 20 to horizontal shift register 22. The potential profile 64 is produced when the voltage to electrode 56 is turned off and the voltage to electrode 58 is turned on.

Charge carriers are transferred from the vertical shift register 15 in the imaging region 12 to the horizontal shift register 20 through a transfer gate 65 (FIGS. 2 and 6) of a type similar to the transfer gate 62. A barrier implant 66 and electrode 56 function in the same manner as p-type barrier implant 60 and electrode 58. As a result of this structure, a gate electrode for this transfer gate is not needed. As shown in FIG. 2, vertical shift register 15 includes an elongated storage region 80 provided adjacent horizontal shift register 20. Storage region 80 has been made elongated to accommodate a wide bus bar (not shown). In order to provide for an efficient transfer of charge carriers from storage region 80, a tapered barrier implant 82 has been formed in storage region 80. The tapered barrier implant 82 results in an electric field providing field-aided drift of the charge carriers. Field-aided drift is a faster transport mechanism than the thermal diffusion process typically encountered in devices having long gate electrodes. The charge capacity of each horizontal shift register 20 and 22 is twice that of the vertical shift registers 15, and thus, a 2×1 charge aggregation can be performed, if desirable. The charge capacity of a storage region in vertical shift register 15 can be, for example, 50,000 $e^{31}$.

In order to transfer charge carriers from horizontal shift register 20 to horizontal shift register 22, the structure shown in FIG. 2 is used. As shown in this FIG., a transfer region 70 between horizontal shift registers 20 and 22 is made wider than an adjacent storage region 72 in horizontal shift register 20. If the width of the transfer region 70 were made less than storage region 72, a potential barrier would exist between storage region 72 and transfer region 70. Such a potential barrier is caused by three factors. Two of the factors have to do with the definition of the channel stops (not shown). During growth of the local field isolation for the channel stops, the "bird's beak" and boron encroach into the active channel region, thereby effectively reducing its width. These factors combine with the third factor, the electrostatic effect, to form the potential barrier. As a result of making the transfer region 70 wider, the potential barrier is eliminated, and the efficient transfer of charge carriers can be accomplished.

Figure 4:
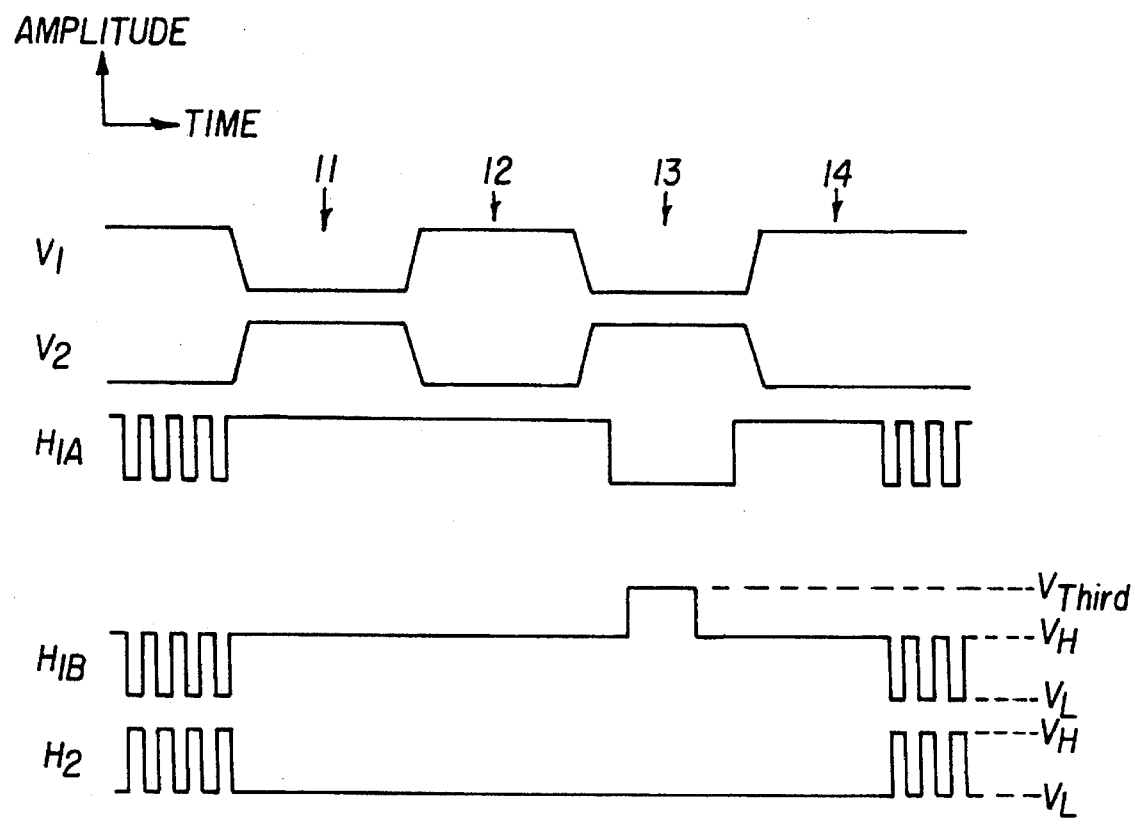
FIG. 4 depicts the waveforms for the various vertical and horizontal clock driver signals used in the arrangement in FIG. 2.
Figure 6:
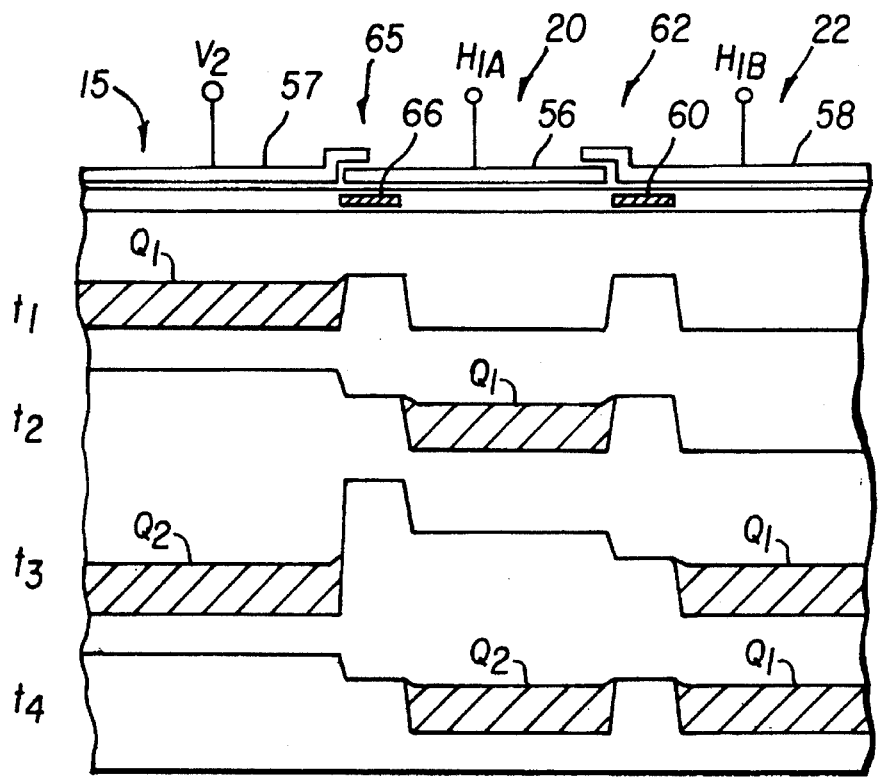
FIG. 6 is a schematic diagram showing the transfer of charge carriers between the imaging region and the horizontal shift registers and between the horizontal shift registers.

The transfer of charge carriers to horizontal shift registers 20 and 22 and between the two registers can be accomplished as illustrated with reference to FIGS. 4 and 6. In FIG. 4, there is shown a timing diagram of the signals provided to image sensor 10 for the transfer of charge carriers from imaging region 12 to horizontal shift register 20 and from horizontal shift register 20 to horizontal shift register 22. In FIG. 6, the transfer of the charge carriers is illustrated for times $t_1$-$t_4$. In FIG. 4, $V_1$ and $V_2$ represent clock signals to a vertical CCD vertical shift register 15 in the imaging region 12, and $H_{1A}$, $H_{1B}$, and $H_2$ represent clock signals to the horizontal shift registers 20 and 22. Thus, at time $t_1$, $V_1$ and $H_2$ are low, $V_2$, $H_{1A}$, $H_{1B}$ are high, and a charge carrier packet $Q_1$ is moved under a gate electrode 57 in the vertical shift register 15. At time $t_2$, $V_2$ goes low, and charge carrier packet $Q_1$ is moved under electrode 56 in horizontal shift register 20. At time $t_3$, $V_2$ goes high, $H_{1A}$ goes low, $H_{1B}$ goes high to the thrid level ($V_3$), charge carrier packet $Q_1$ is moved under electrode 58 in horizontal shift register 22, and a new charge carrier packet $Q_2$ is moved under electrode 57. At time $t_4$, $V_2$ goes low, and charge carrier packet $Q_2$ is moved under electrode 56. After time $t_4$, $H_{1A}$, $H_{1B}$, $H_2$ are cycled as shown to move the charge carrier packets $Q_1$ and $Q_2$ out of the horizontal shift registers 20 and 22. It is important to note that $H_{1A}$ and $H_{1B}$ are clocked in unison during this time and that the potential barrier created by p-type barrier implant 60 maintains the separation of charge packets $Q_1$ and $Q_2$.

The arrangement of horizontal registers disclosed herein can be used for parallel readout of two complete lines of signal charge at data rates in excess of 30 frames per second. A single channel readout mode can also be used if desired, since each horizontal register has enough pixels to contain a full line of information from the imaging region. As a result of eliminating the separate transfer gate between the horizontal registers in image sensor 10, only three clocks are required to operate both registers. It will be apparent to those skilled in the art that the principles of the present invention could be used in a device having more than two horizontal registers.

The operation of the image sensor and shift registers under the control of the horizontal and vertical clock driver signal will now be discussed. A planar view and the timing of A to B transfer of charge is shown in FIG. 4. For a two line transfer, the vertical clocks $V_1$ and $V_2$ change state twice and the horizontal clock which is unchanged during first transfer, changes state during the second transfer. The first horizontal shift register represented as A turns low while second horizontal shift register represented as B assumes very high voltage which is higher than normal high level which is represented as third level. The clock driver signal has to clock out the image sensor at horizontal register speed which is in the order of 30 to 40 megahertz. Three level clock drivers are very common when used for vertical clocks. The time for vertical clocks for sensors designed for 30 frames per second is in the order of up to 12 microseconds.

Figure 5:
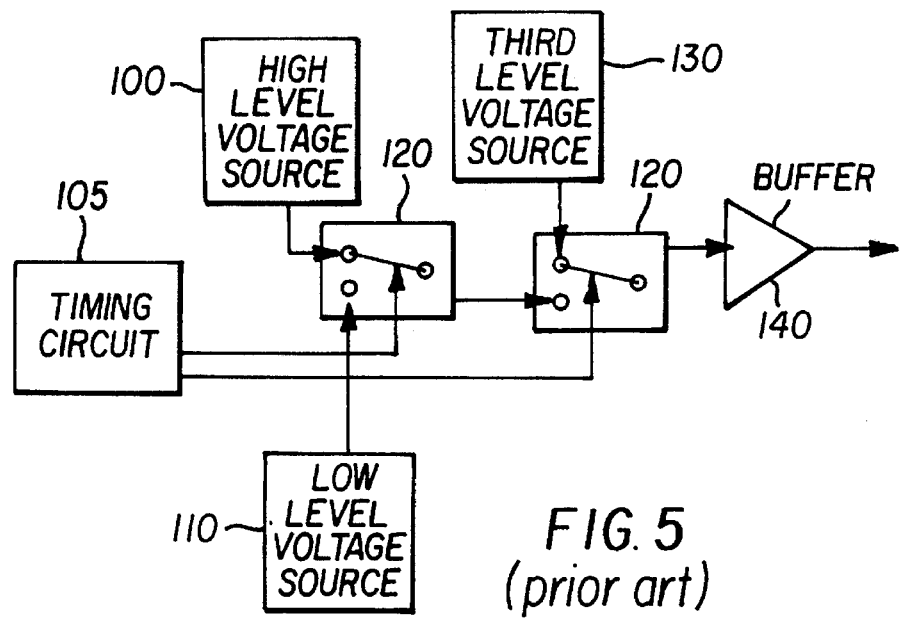
FIG. 5 is a prior art three level clock driver circuit shown in schematic format.

A prior art clock driver circuit for a three level output is shown in FIG. 5. The low level (110), high level (100), and third level (130) voltage sources are selected by turning on the corresponding semiconductor switches 120. A buffer amplifier 140 provides enough drive current to provide three level output to the image sensor which presents a capacitive load. The timing circuit 105 provides the timing control for semiconductor switches 120. These semiconductor switches 120 work only up to 500 kilohertz to 1 megahertz speed. There are number of innovations that have emerged in recent times to run the kind of output structures shown in FIG. 2 with the driver at very high speeds at least as fast as 40 megahertz (see U.S. Pat. No. 5,047,660, the disclosure which is incorporated herein by reference). A very innovative clock driver circuit is disclosed in U.S. Pat. No. 5,237,422, which provides a vertical clock with three levels having a pulsewidth of 250 nanoseconds.

In accordance with the present invention, a circuit drives high capacitive loads presented by CCDs in the order of 150 pf to 500 pf at 20 megahertz to 40 megahertz rate with a clock swing of at least 10 volts and provides a third level on to the driver at very high speed. The circuit provides a clock signals having a third level so unique that can be adapted to any high speed, low load or low speed, high load drivers. The method presented is flexible in terms of load and frequency. The circuit has been built and tested for a load of 150 pf running at 30 megahertz. The clock driver uses low cost, off the shelf parts. The power dissipation is very minimal and hence does not need any external cooling. The method of providing third level with out using switches has been implemented with different types of high speed clock drivers.

Figure 7:
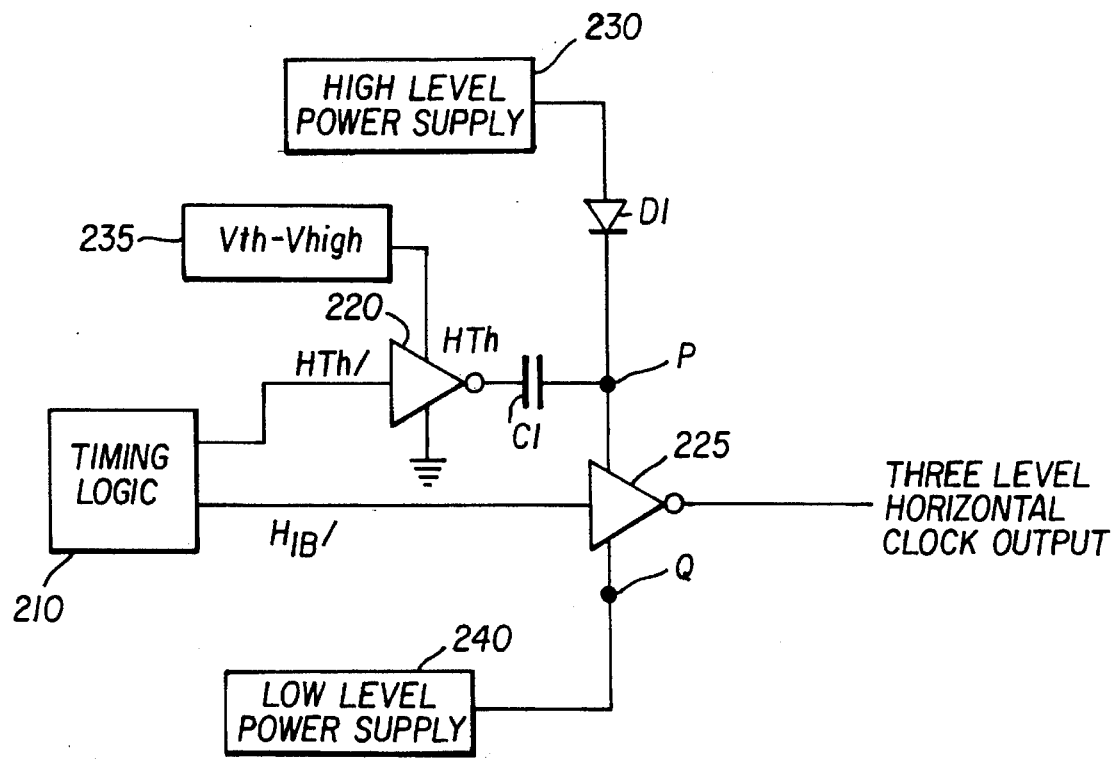
FIG. 7 depicts a simplified circuit arrangement for producing a three level clock driver signal in accordance with the present invention.

In accordance with this invention, there is a third level voltage for a high (up to 40 megahertz) speed CCD clock driver with out using analog switches. This arrangement can be used for any output driver structure. A circuit in accordance with the invention is shown in FIG. 7. The driver 225 uses high speed NPN switching transistors and providing complementary signals in to the bases of those transistors. The driver 225 is connected to a low level power supply 240. The DS 0026, 74F04, and DS 0056 drivers of National Semiconductor Company belong to this category. The driver 225 may also be provided with an output structure which uses complementary transistors namely PNP and NPN transistors. However, the signals are conditioned to enable both the transistors to switch as fast as they can. A more detailed version of the circuit is shown in FIG. 9 which will be discussed later.

Figure 8:
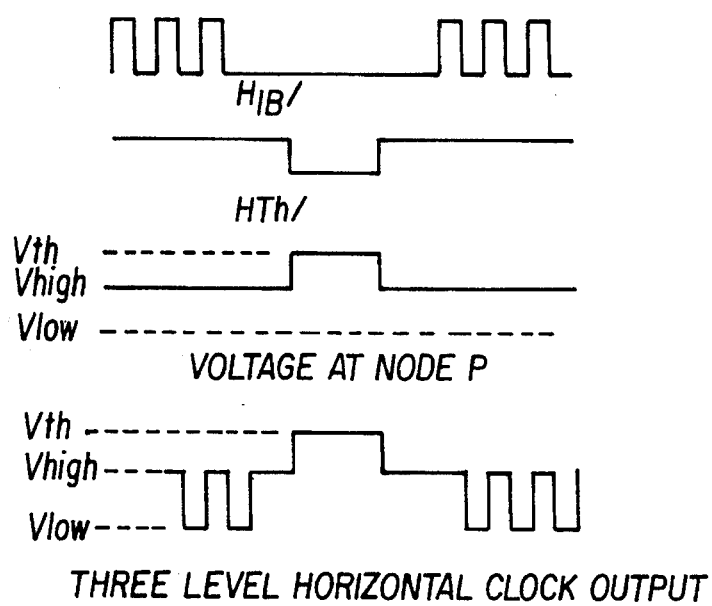
FIG. 8 depicts the waveforms produced by the circuit of FIG. 7 and which are also shown in FIG. 4.

The operation of the FIG. 7 circuit can be better understood with the wave forms shown in FIG. 8. Timing logic 210 generates various pulses needed for the sensor system including the HTh/(inverse of horizontal third level) and $H_{1B}$/(inverse of horizontal B clock) which were shown in FIG. 8. The voltage at node P when HTh is low is at Vhigh (high level) neglecting the diode drop. During the time HTh/low the output of driver 220 which is an inverter will be a positive going pulse whose amplitude is set by block diagram 235 which is equal to Vth-Vhigh (the absolute difference of third level and high level voltage). The output of driver 220 will be Vth-Vhigh but the node P is diode clamped due to C1 and D1 thus giving a Vth as shown in FIG. 8. By this, the driver 225 output lies in between supply levels, which are the voltages at node P and node Q. The output of driver 225 is normally varied between Vhigh and Vlow, except during the time Hth/going low, it will be at Vth level. Thus a very smooth three level high speed clock output is generated.

Figure 9:
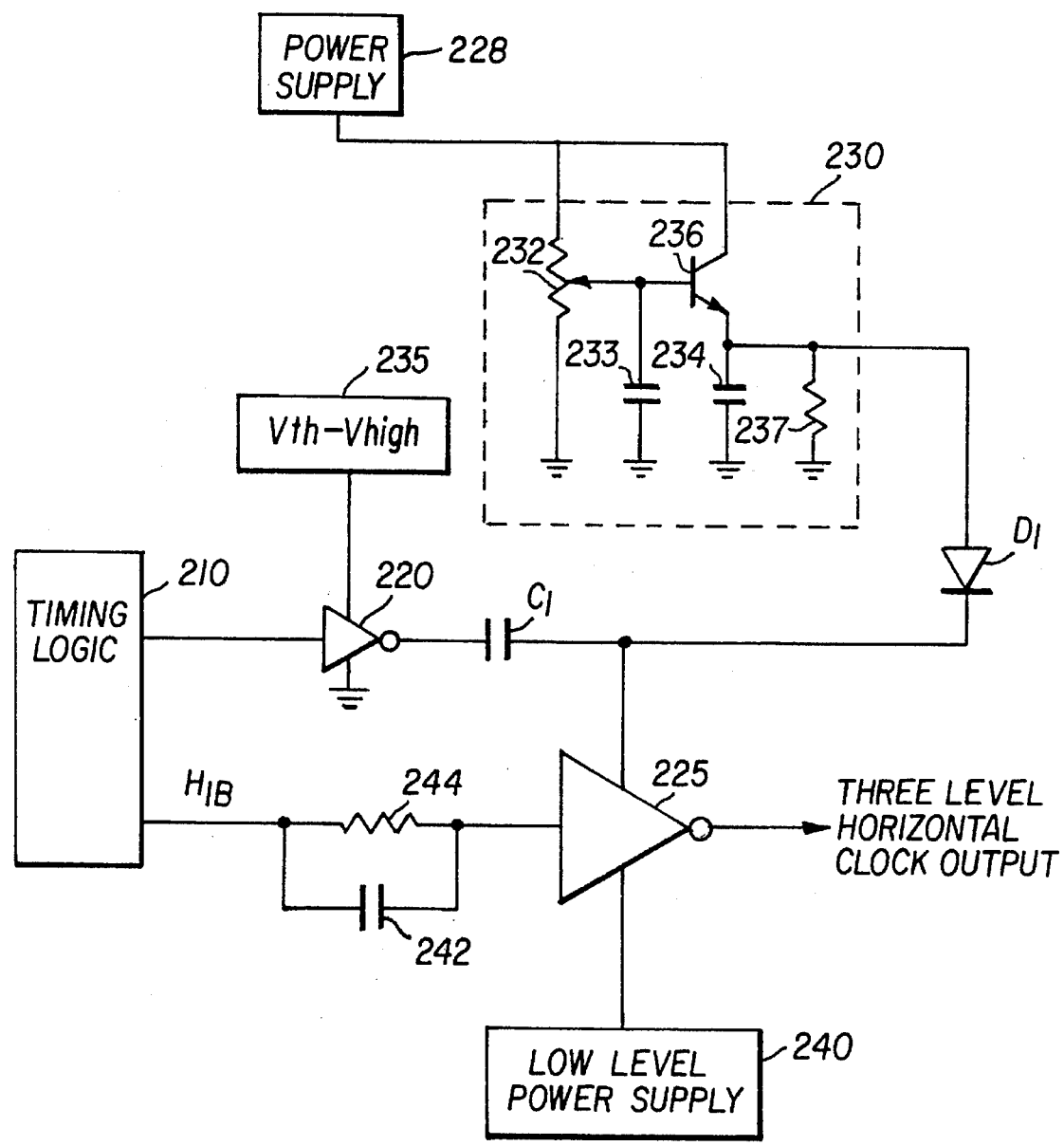
FIG. 9 depicts in more detail a circuit actually implemented in accordance with the present invention.

Turning now to FIG. 9 where there is shown more details of an embodiment of the circuit shown in FIG. 8. A 15 volts power supply 228 provides a 15 volts to the circuitry 230. The circuitry 230 includes a potentiometer (adjustable resistor) 232 and an emitter follower transistor 236, both connected to the voltage power supply 228. A capacitor 233 is connected to the base of the transistor 236 and to the potentiometer 232. The emitter of the transistor 236 is coupled to a parallel combination of a capacitor $C_1$ and a resistor 237. The other ends of potentiometer 232, capacitor 233,234 and resistor 237 are connected to the circuit ground. The output of circuitry 230 is directly connected to the diode $D_1$ which is coupled to the driver 225. The Vth-Vhigh block diagram 235 is similar in construction to the high voltage level circuitry 230 and need not be described here. Also, the low level power supply 240 is similar in construction to that of circuitry 230 except it uses PNP transistor in place of NPN transistor to sink the current. As shown, the $H_{1B}$ signal is coupled through the parallel combination of a capacitor 242 and a resistor 244.

In conclusion this invention provides a high speed three level clock driver with out using analog switches. The simple and versatile approach is so unique that can be adopted for any high speed building block driver.

The invention has been described in detail with particular reference to certain preferred embodiments thereof, but it will be understood that variations and modifications can be effected within the spirit and scope of the invention.

PARTS LIST

10 image sensor
12 imaging region
14 photosensitive elements
15 vertical shift register
20 horizontal shift register
22 horizontal shift register 24 buffer amplifiers
26 buffer amplifiers
50 substrate
52 buried channel
56 electrode
57 electrode
58 electrode
60 p-type barrier implant
62 transfer gate
64 potential profile
65 transfer gate
66 barrier implant
70 transfer region
72 storage region
80 storage region
82 tapered barrier implant
100 high level voltage source
105 timing circuit
110 low level voltage source
120 semiconductor switches
130 third level voltage source
140 buffer amplifier
210 timing logic
220 driver
225 driver
228 power supply
230 circuitry
232 potentiometer
233 capacitor
235 block diagram
236 transistor
237 resistor
242 capacitor
244 resistor

I claim:

1. A high speed clock driver circuit for use with an area image sensor comprising:

a) first and second horizontal shift registers;

b) means for producing vertical transfer signals for causing the transfer of a line of pixels from the image sensor in parallel into the first horizontal shift register;

c) means for producing two inverted horizontal high speed clock driver signals with one of such signals having a third level, such inverted horizontal signals being used for transfer of pixels from the respective first and second shift horizontal registers; and d) means responsive to the third level of one of the horizontal high speed clock driver signal and the vertical transfer signals for enabling the transfer, in parallel, of pixels from the first register into the second horizontal shift register.

2. The invention as set forth in claim 1 wherein inverted signal producing means comprises:

i) a source of high voltage and a first source of low voltage;

ii) a first clock driver coupled to the high and first low voltage sources and selectively producing a high voltage or low voltage signal;

iv) a capacitor and a diode connected between the source of high voltage for charging the capacitor to a high level;

v) a second clock driver adapted to selectively produce a difference voltage signal and a second low level voltage signal and coupling such second low level signal to the capacitor so that when the high voltage level and the second voltage level are connected across the capacitor, a third higher level voltage is applied to the first driver circuit; and vi) timing logic coupled to the first and second driver circuits for connecting them to the various voltage sources.

* * * * *